(12) United States Patent
Didehvar

(10) Patent No.: US 8,960,456 B2
(45) Date of Patent: Feb. 24, 2015

(54) MOLDED TENSION ROD MECHANISM WITH SINGLE LOCK NUT

(75) Inventor: Kaveh Didehvar, Hockessin, DE (US)

(73) Assignee: Zenith Products Corporation, New Castle, DE (US)

( * ) Notice: Subject to any disclaimer, the term of this patent is extended or adjusted under 35 U.S.C. 154(b) by 0 days.

(21) Appl. No.: 13/269,108

(22) Filed: Oct. 7, 2011

(65) Prior Publication Data

US 2012/0152874 A1  Jun. 21, 2012

Related U.S. Application Data

(60) Provisional application No. 61/424,441, filed on Dec. 17, 2010.

(51) Int. Cl.
*A47H 1/08* (2006.01)
*F16B 7/14* (2006.01)
*A47K 3/38* (2006.01)

(52) U.S. Cl.
CPC ............... *F16B 7/1463* (2013.01); *A47K 3/38* (2013.01)
USPC ..................................... 211/105.4; 403/109.5

(58) Field of Classification Search
USPC ........ 211/105.4, 105.1–105.3, 107, 123, 124; 403/109.5, 374.4, 369, 370, 371; 248/251, 265, 274.1, 354.3, 354.4, 248/354.6
See application file for complete search history.

(56) References Cited

U.S. PATENT DOCUMENTS

| | | | |
|---|---|---|---|
| D19,582 S | 1/1890 | Lau | |
| 653,642 A | * 7/1900 | Darling | 403/104 |
| 839,959 A | 1/1907 | Richards | |
| 1,481,730 A | 1/1924 | Oakley | |
| 1,502,154 A | 7/1924 | Meuller | |
| 1,675,111 A | 6/1928 | Kenney | |
| 1,679,881 A | 8/1928 | Simpson | |
| 1,721,305 A | 7/1929 | Koering | |
| 1,721,306 A | 7/1929 | Koering | |

(Continued)

FOREIGN PATENT DOCUMENTS

| CH | 625601 A5 | 9/1981 |
|---|---|---|
| CN | 2221357 Y | 3/1996 |

(Continued)

OTHER PUBLICATIONS

Office Action issued Apr. 2, 2013 in U.S. Appl. No. 29/437,013.

(Continued)

*Primary Examiner* — Korie H Chan
(74) *Attorney, Agent, or Firm* — Panitch Schwarze Belisario & Nadel LLP

(57) ABSTRACT

A tension rod mechanism for a tension rod having a second inner shaft slideably received by a first outer shaft and rotatable about a longitudinal axis of the tension rod. An expandable collar is threadingly engaged with a tapered first threaded shaft is configured to be received in the first outer shaft for rotational movement therewith and slidable axial movement relative thereto. A second attachment shaft fixedly connected to the tapered first threaded shaft is configured to be received in the second inner shaft for rotational and slidable axial movement therewith. When the expandable collar is in the first outer shaft and the second attachment shaft is fixedly received in the second inner shaft, a first rotation of the first outer shaft relative to the second inner shaft expands a diameter of the collar fixedly attaching the expandable collar to the first outer shaft for axial movement therewith.

10 Claims, 3 Drawing Sheets

(56) References Cited

U.S. PATENT DOCUMENTS

| | | | |
|---|---|---|---|
| D81,134 S | 5/1930 | Henderson | |
| 1,837,340 A | 12/1931 | Schwartz | |
| 1,951,660 A | 3/1934 | Klaudt | |
| 1,953,450 A | 4/1934 | Thompson | |
| 2,131,156 A | 9/1938 | Yardley | |
| 2,150,204 A | 3/1939 | Boye | |
| D119,576 S | 3/1940 | Kirsch | |
| 2,194,064 A | 3/1940 | Boye | |
| 2,195,979 A | 4/1940 | Ziolkowski | |
| 2,215,331 A | 9/1940 | Marsh | |
| 2,219,075 A | 10/1940 | Veau | |
| 2,250,003 A | 7/1941 | Boye | |
| 2,293,168 A | 8/1942 | Pirone | |
| 2,383,104 A | 8/1945 | Allen | |
| 2,458,643 A | 1/1949 | Riley | |
| 2,462,321 A | 2/1949 | Holmes | |
| 2,519,996 A | 8/1950 | Blake | |
| 2,562,371 A | 7/1951 | Shannon | |
| 2,637,555 A | 5/1953 | Klaudt | |
| 2,778,030 A | 1/1957 | Goche | |
| 2,796,227 A | 6/1957 | Coakley | |
| 2,915,327 A * | 12/1959 | Kreske | 403/104 |
| 2,919,134 A * | 12/1959 | Zuro | 482/129 |
| 2,974,806 A | 3/1961 | Seewack | |
| 3,023,909 A | 3/1962 | Henry | |
| 3,079,005 A | 2/1963 | Bednar | |
| 3,107,361 A | 10/1963 | Glutting, Sr. | |
| 3,418,665 A | 12/1968 | Long | |
| 3,429,452 A | 2/1969 | Johnson | |
| 3,493,121 A | 2/1970 | Doyle | |
| 3,504,805 A | 4/1970 | Doyle | |
| 3,521,758 A | 7/1970 | Guilfoyle, Sr. | |
| 3,557,390 A | 1/1971 | Ruggles et al. | |
| 3,572,511 A | 3/1971 | Triplett | |
| 3,687,499 A | 8/1972 | Guilfoyle, Sr. | |
| 3,864,760 A | 2/1975 | Bowen | |
| D248,434 S | 7/1978 | Clivio et al. | |
| 4,117,557 A | 10/1978 | McPeak et al. | |
| 4,229,842 A | 10/1980 | Gilmore | |
| 4,238,164 A * | 12/1980 | Mazzolla | 403/109.5 |
| 4,329,076 A | 5/1982 | Coreth | |
| 4,378,071 A | 3/1983 | Yakimicki | |
| 4,399,917 A | 8/1983 | Ohman | |
| 4,461,056 A | 7/1984 | Solinski | |
| 4,496,059 A | 1/1985 | Leiter | |
| 4,586,615 A | 5/1986 | Quitmann | |
| 4,636,106 A | 1/1987 | Waisbrod | |
| D293,297 S | 12/1987 | Wood | |
| 4,754,504 A | 7/1988 | Cellini | |
| 4,809,401 A | 3/1989 | Honig | |
| D301,976 S | 7/1989 | Greenhut et al. | |
| 4,895,471 A | 1/1990 | Geltz et al. | |
| 5,022,104 A | 6/1991 | Miller | |
| 5,056,753 A | 10/1991 | Lunau et al. | |
| 5,103,531 A | 4/1992 | Perrotta | |
| D327,421 S | 6/1992 | Pagan | |
| 5,189,759 A | 3/1993 | Poore | |
| 5,216,766 A | 6/1993 | Lang | |
| 5,236,229 A | 8/1993 | Gonzalez | |
| 5,242,065 A | 9/1993 | Hoban | |
| 5,263,594 A | 11/1993 | Bianchi | |
| 5,281,063 A | 1/1994 | Austin, III | |
| D347,784 S | 6/1994 | Warshawsky | |
| 5,330,061 A | 7/1994 | Geltz | |
| 5,433,551 A * | 7/1995 | Gordon | 403/377 |
| 5,477,964 A | 12/1995 | Hart | |
| 5,484,056 A | 1/1996 | Wood | |
| D374,167 S | 10/1996 | Scholl | |
| 5,561,870 A | 10/1996 | Hertel | |
| D376,312 S | 12/1996 | Cahn et al. | |
| D377,753 S | 2/1997 | Meadows | |
| D379,297 S | 5/1997 | Shires | |
| 5,662,297 A | 9/1997 | Christensen et al. | |
| D385,177 S | 10/1997 | Perry | |
| 5,678,703 A | 10/1997 | Sawyer | |
| D393,390 S | 4/1998 | Gottwald | |
| D397,928 S | 9/1998 | Wise | |
| 5,803,643 A * | 9/1998 | Patelli et al. | 403/109.1 |
| 5,876,147 A * | 3/1999 | Longo | 403/109.5 |
| 5,894,610 A | 4/1999 | Winter | |
| D416,785 S | 11/1999 | Ming-Hsiao | |
| D426,142 S | 6/2000 | Moore | |
| D429,461 S | 8/2000 | Rowlay | |
| 6,101,675 A | 8/2000 | Goldstein | |
| D431,460 S | 10/2000 | Nichol | |
| D438,462 S | 3/2001 | Nichol | |
| 6,216,287 B1 | 4/2001 | Wise | |
| 6,263,523 B1 | 7/2001 | Moore | |
| 6,302,180 B1 | 10/2001 | Yu | |
| 6,302,614 B1 * | 10/2001 | Tseng | 403/109.5 |
| D466,399 S | 12/2002 | Jessee et al. | |
| 6,543,629 B1 | 4/2003 | Samelson | |
| 6,640,395 B2 | 11/2003 | Bush | |
| 6,651,831 B2 | 11/2003 | Samelson | |
| D483,251 S | 12/2003 | Suero, Jr. | |
| 6,694,543 B2 | 2/2004 | Moore | |
| 6,715,163 B1 | 4/2004 | Cunningham | |
| D489,249 S | 5/2004 | Moore | |
| 6,745,909 B1 | 6/2004 | Lai | |
| D498,663 S | 11/2004 | Moore | |
| 6,824,000 B2 | 11/2004 | Samelson | |
| 6,845,955 B1 | 1/2005 | Hsu | |
| 6,862,776 B2 * | 3/2005 | Chen | 16/113.1 |
| 6,883,664 B2 | 4/2005 | Lee | |
| D506,920 S | 7/2005 | Taylor | |
| 6,913,156 B1 | 7/2005 | Wolff | |
| 7,024,706 B2 | 4/2006 | Hess | |
| D522,845 S | 6/2006 | Suero | |
| D522,846 S | 6/2006 | Suero, Jr. | |
| D522,847 S | 6/2006 | Suero, Jr. | |
| 7,055,680 B2 | 6/2006 | Liebers | |
| D525,115 S | 7/2006 | Harwanko | |
| 7,076,815 B2 | 7/2006 | Orpilla | |
| 7,111,336 B1 | 9/2006 | Lai | |
| D534,062 S | 12/2006 | van den Bosch | |
| D542,125 S | 5/2007 | Kaminski | |
| D542,897 S | 5/2007 | Harwanko | |
| D543,754 S | 6/2007 | Bauer et al. | |
| D543,756 S | 6/2007 | Gilbert | |
| D543,839 S | 6/2007 | Cooper et al. | |
| D544,786 S | 6/2007 | Barrese | |
| D547,165 S | 7/2007 | Barrese | |
| D550,542 S | 9/2007 | Worrall et al. | |
| D552,455 S | 10/2007 | Moore | |
| 7,296,772 B2 | 11/2007 | Wang | |
| D557,590 S | 12/2007 | Moore | |
| D563,209 S | 3/2008 | Samelson | |
| D563,526 S | 3/2008 | Bauer | |
| D565,937 S | 4/2008 | Tsai | |
| D567,637 S | 4/2008 | Moore | |
| D576,022 S | 9/2008 | Goldstein | |
| D577,991 S | 10/2008 | Chen | |
| D586,647 S | 2/2009 | Didehvar | |
| 7,512,997 B2 | 4/2009 | Dewees | |
| 7,597,297 B2 | 10/2009 | Isfeld et al. | |
| D618,542 S | 6/2010 | Bertken | |
| 7,762,508 B2 | 7/2010 | Xu | |
| D624,807 S | 10/2010 | Barrese | |
| D624,808 S | 10/2010 | Krawczak et al. | |
| 7,857,151 B2 | 12/2010 | Barrese | |
| D631,273 S | 1/2011 | O'Brien et al. | |
| D631,732 S | 2/2011 | Krawczak et al. | |
| D633,780 S | 3/2011 | Barrese | |
| D634,609 S | 3/2011 | Bauer | |
| D636,660 S | 4/2011 | O'Connell | |
| 7,926,127 B2 | 4/2011 | Barrese | |
| 7,950,534 B2 | 5/2011 | Kao | |
| D640,078 S | 6/2011 | Gilbert | |
| 7,958,577 B2 | 6/2011 | Chang | |
| 7,987,532 B2 | 8/2011 | Bathurst et al. | |
| 7,987,534 B2 | 8/2011 | Lin | |
| 7,997,428 B2 | 8/2011 | Goldstein | |
| 8,015,633 B2 | 9/2011 | Ho | |
| D648,619 S | 11/2011 | Lowe | |

(56) References Cited

U.S. PATENT DOCUMENTS

| | | | |
|---|---|---|---|
| D648,834 S | 11/2011 | Gilbert | |
| 8,056,873 B1 | 11/2011 | Hanley et al. | |
| D650,263 S | 12/2011 | Barrese | |
| 8,069,507 B2 | 12/2011 | Didehvar et al. | |
| 8,069,508 B2 | 12/2011 | O'Connell | |
| 8,146,182 B2 | 4/2012 | Bauer | |
| 8,185,981 B2 | 5/2012 | Didehvar et al. | |
| 8,214,938 B2 | 7/2012 | Hanley et al. | |
| 8,215,501 B2 | 7/2012 | Trettin et al. | |
| 8,215,863 B2 * | 7/2012 | Sohn | 403/109.5 |
| D667,295 S | 9/2012 | Harwanko | |
| 8,297,870 B2 | 10/2012 | Lenhart | |
| D671,395 S | 11/2012 | Harwanko | |
| 8,341,775 B2 | 1/2013 | Didehvar | |
| 8,505,129 B2 | 8/2013 | Parker et al. | |
| 8,505,749 B2 | 8/2013 | Trettin et al. | |
| 8,522,373 B2 | 9/2013 | Bauer | |
| D691,030 S | 10/2013 | Lindo et al. | |
| 2003/0034316 A1 | 2/2003 | Kao | |
| 2003/0052070 A1 | 3/2003 | Weisenburger | |
| 2004/0178310 A1 | 9/2004 | Marion | |
| 2004/0182806 A1 | 9/2004 | Figueroa | |
| 2005/0053423 A1 | 3/2005 | Doubler et al. | |
| 2005/0230587 A1 | 10/2005 | Yang | |
| 2005/0268394 A1 | 12/2005 | Monk et al. | |
| 2006/0070177 A1 | 4/2006 | Bathurst et al. | |
| 2006/0156465 A1 | 7/2006 | Lavi et al. | |
| 2006/0218717 A1 | 10/2006 | van den Bosch | |
| 2007/0006377 A1 | 1/2007 | Moore | |
| 2007/0006378 A1 | 1/2007 | Moore | |
| 2007/0174956 A1 | 8/2007 | Heaslip | |
| 2008/0022451 A1 | 1/2008 | Urlich et al. | |
| 2008/0028513 A1 | 2/2008 | Didehvar | |
| 2008/0115265 A1 | 5/2008 | Heaslip | |
| 2008/0184479 A1 | 8/2008 | Bathurst | |
| 2008/0210827 A1 | 9/2008 | Samelson | |
| 2008/0245486 A1 | 10/2008 | Brown | |
| 2008/0245940 A1 | 10/2008 | Brown | |
| 2008/0282464 A1 | 11/2008 | Bauer | |
| 2008/0289096 A1 | 11/2008 | Patel | |
| 2009/0083905 A1 | 4/2009 | O'Connell | |
| 2011/0011813 A1 | 1/2011 | Kao | |
| 2011/0113547 A1 | 5/2011 | O'Connell | |
| 2012/0005823 A1 | 1/2012 | Baines | |
| 2012/0023657 A1 | 2/2012 | Didehvar et al. | |
| 2012/0036628 A1 | 2/2012 | O'Connell | |
| 2012/0110729 A1 | 5/2012 | Baines | |
| 2012/0152872 A1 | 6/2012 | Didehvar | |
| 2012/0152873 A1 | 6/2012 | Didehvar | |
| 2012/0152874 A1 | 6/2012 | Didehvar | |
| 2012/0167368 A1 | 7/2012 | Napier et al. | |
| 2012/0241399 A1 | 9/2012 | Trettin et al. | |
| 2012/0284914 A1 | 11/2012 | Bauer | |
| 2012/0285914 A1 | 11/2012 | Carney | |

FOREIGN PATENT DOCUMENTS

| | | |
|---|---|---|
| CN | 2228573 Y | 6/1996 |
| CN | 2349932 Y | 11/1999 |
| CN | 2566754 Y | 8/2003 |
| CN | 2835679 | 11/2006 |
| CN | 2893271 Y | 4/2007 |
| CN | 2902096 | 5/2007 |
| CN | 201001603 Y | 1/2008 |
| CN | 201189069 Y | 2/2009 |
| CN | 201363343 Y | 12/2009 |
| GB | 2325397 A | 11/1998 |
| GB | 2400813 A | 10/2004 |
| GB | 2426693 A | 12/2006 |
| JP | 2000-046021 A | 2/2000 |
| JP | 2001-112561 A | 4/2001 |
| JP | 2004-036803 A | 2/2004 |
| JP | 2004-057213 A | 2/2004 |

OTHER PUBLICATIONS

U.S. Appl. No. 29/451,499 by Harwanko, filed Apr. 3, 2013.
U.S. Appl. No. 13/911,191 by Didehvar, filed Jun. 6, 2013.
Office Action issued Jun. 21, 2013 in U.S. Appl. No. 13/752,724 by Lindo.
Office Action issued Oct. 4, 2013 in U.S. Appl. No. 13/268,712 by Didehvar.
Office Action issued Oct. 11, 2013 in U.S. Appl. No. 13/269,030 by Didehvar.
Office Action issued Nov. 29, 2013 in U.S. Appl. No. 13/268,712 by Didehvar.
Office Action issued Dec. 27, 2013 in U.S. Appl. No. 13/752,724 by Lindo.
U.S. Appl. No. 14/258,546 by Vaccaro, filed Apr. 22, 2014.
<http://plumbing.hardwarestore.com/51-283-shower-rods-and-holders/stanless-steel-curved-shower-rod-609421.aspx>; "Stanless Steel Curved Shower Rod, 1"+ 5'"; web page printout date: Feb. 10, 2010; original web posting date: unknown, 1 page. (admitted prior art).
Office Action issued Jul. 8, 2011 in U.S. Appl. No. 11/833,044.
U.S. Appl. No. 13/253,617, filed Oct. 5, 2011.
Office Action issued Dec. 11, 2012 in U.S. Appl No. 29/381,234.
Notice of Allowance issued Jul. 24, 2012 in U.S. Appl. No. 29/422,283.
U.S. Appl. No. 29/398,880 by Lindo, filed Aug. 5, 2011.
Office Action issued Feb. 16, 2012 in U.S. Appl. No. 13/253,617.
U.S. Appl. No. 29/381,234 by Didehvar, filed Dec. 16, 2010.
U.S. Appl. No. 29/390,736 by Harwanko, filed Apr. 28, 2011.
U.S. Appl. No. 13/676,800 by Didehvar, filed Nov. 14, 2012.
U.S. Appl. No. 13/676,802 by Didehvar, filed Nov. 14, 2012.
Office Action issued Jul. 20, 2011 in U.S. Appl. No. 12/157,376.
Office Action issued Nov. 22, 2011 in U.S. Appl. No. 12/157,376.
U.S. Appl. No. 29/437,013 by Didehvar, filed Nov. 12, 2012.
U.S. Appl. No. 29/443,578 by Lindo, filed Jan. 18, 2013.
<http://www.amazon.com/Polder-Radial-Duo-Shower-Rod/dp/001CEONRY>; Polder Radial Duo Shower Rod, web page printout date: Jun. 2, 2011; original web posting date and product availability date: Unknown, 3 pages. (admitted prior art).
U.S. Appl. No. 29/398,881 by Walker, filed Aug. 5, 2011.
Photograph of Curved Shower Rod by Hardware Resources (admitted prior art).
Photograph of a curved shower rod distributed by Popular Bath Products, Inc. (admitted prior art).
Photographs of Tension Rod With End Cap and Cover (1)—Date Unknown—Admitted Prior Art.
Photographs of Tension Rod With End Cap and Cover (2)—Date Unknown—Admitted Prior Art.
U.S. Appl. No. 13/752,724 by Lindo, filed Jan. 29, 2013.
Three photographs of Maytex Mills "EZ-Up" tension rod (date unkown) (admitted prior art).

* cited by examiner

MOLDED TENSION ROD MECHANISM WITH SINGLE LOCK NUT

CROSS-REFERENCE TO RELATED APPLICATIONS

This application is related to U.S. Provisional Patent Application No. 61/424,441, filed Dec. 17, 2010, and claims the earlier filing dates of the provisional applications. The above-identified related application is incorporated herein by reference.

BACKGROUND OF THE INVENTION

An embodiment of the present invention relates generally to an adjustable tension rod mechanism, and more particularly, to an adjustable tension rod mechanism having a single lock nut for locking the tension rod mechanism in place.

Adjustable length tension rods for use as curtain or shower rods are generally used as an alternative to rods that are permanently fixed to support surfaces through the use of screws, bolts, or the like. This provides for simpler installation and prevents permanent damage to the support surfaces upon removal. These tension rods typically include a first shaft that telescopingly receives a second shaft, wherein the first and second shafts house a long threaded stud. The tension rod is often shipped and purchased in a contracted state, such that a user must expand the tension rod for installation at the desired location. Once the desired length is reached, i.e., the end faces of the tension rod contact the walls or other support surfaces, the first and second shafts are rotated with respect to each other until a sufficient force is applied against the support surfaces to maintain the tension rod in compression and in place.

In tension rods having the long threaded stud, expansion is accomplished by rotating the first and second shafts with respect to one another until the desired length is reached. A user often must expand the tension rod by twenty or more inches, and the constant rotation required can be time-consuming and exhausting.

More recently, tension rods have been introduced that allow the user to easily expand the tension rod by pulling the first and second shafts in opposing directions. However, the tension rod must be pulled to a length that is larger than the distance between the support surfaces. Tension is then applied by compressing a spring within the tension rod until the desired length is achieved. Once in place, the force of the compressed spring provides the tension for holding the tension rod in place between the support surfaces. The spring can be difficult to compress, and positioning of the tension rod may scuff or damage the support surfaces as the rod is put into place. Further, if not properly locked into place, the spring may release and cause injury to the user. Because the strength of the spring must be selected to balance between user friendliness and allow the rod to support sufficient weight, which can be up to twenty pounds, weight support is often sacrificed.

It is therefore desirable to provide an adjustable tension rod mechanism that is easy to expand to the desired length, but does not require spring compression or the use of other hazardous mechanisms for providing the necessary tension between the support surfaces.

BRIEF SUMMARY OF THE INVENTION

Briefly stated, one embodiment of the present invention is directed to a tension rod mechanism for a tension rod has a first outer shaft and a second inner shaft slideably received by the first outer shaft and rotatable about a longitudinal axis of the tension rod. The tension rod mechanism comprises a tapered first threaded shaft. An expandable collar is threadingly engaged with the tapered first threaded shaft. The expandable collar is configured to be received in the first outer shaft for rotational movement therewith and slidable axial movement relative thereto. A second attachment shaft fixedly connected to the tapered first threaded shaft, the second attachment shaft configured to be received in the second inner shaft for rotational and slidable axial movement therewith. When the expandable collar is in the first outer shaft and the second attachment shaft is fixedly received in the second inner shaft, a first rotation of the first outer shaft relative to the second inner shaft expands a diameter of the collar fixedly attaching the expandable collar to the first outer shaft for axial movement therewith.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1A:
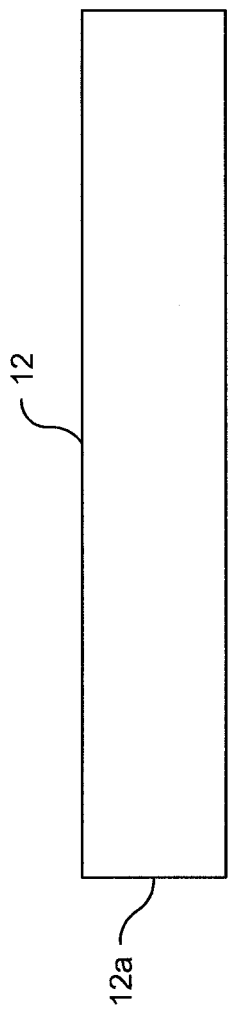
FIG. 1A is a side elevational view of a first outer shaft of a tension rod in accordance with a preferred embodiment of the present invention.

Reference will now be made in detail to embodiments of the invention, examples of which are illustrated in the accompanying drawings. The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The words "right," "left," "lower" and "upper" designate directions in the drawings to which reference is made. The words "inwardly" and "outwardly" refer to directions toward and away from, respectively, the geometric center of the structure to which reference is made, and designated parts thereof. The terminology includes the words noted above, derivatives thereof and words of similar import.

Although the words first, second, etc., are used herein to describe various elements, these elements should not be limited by these words. These words are only used to distinguish one element from another. For example, a first shaft could be termed a second shaft, and, similarly, a second shaft could be termed a first shaft, without departing from the scope of the present invention.

As used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The following description is directed towards various embodiments of a tension rod mechanism in accordance with the present invention.

Figure 1B:
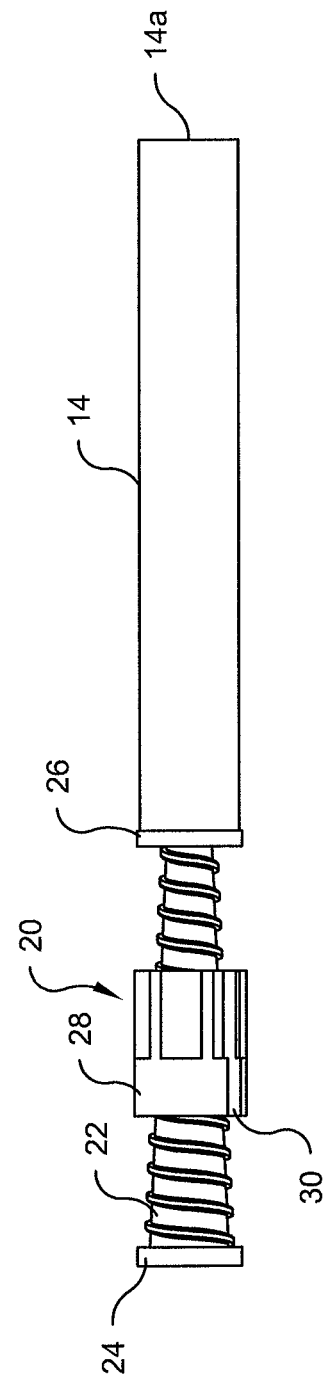
FIG. 1B is a side elevational view of a second inner shaft of a tension rod in accordance with a preferred embodiment of the present invention.
Figure 2:
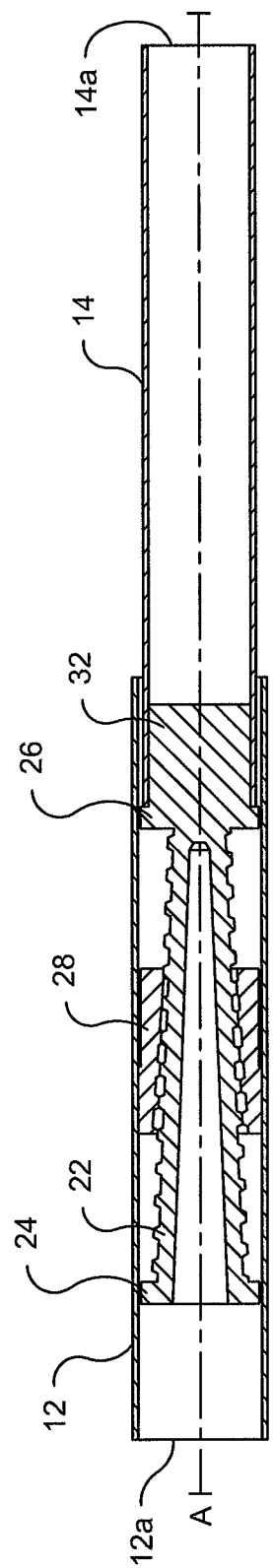
FIG. 2 is a cross-sectional view of the tension rod assembled from the first and second shafts shown in FIGS. 1A-1B.
Figure 3:
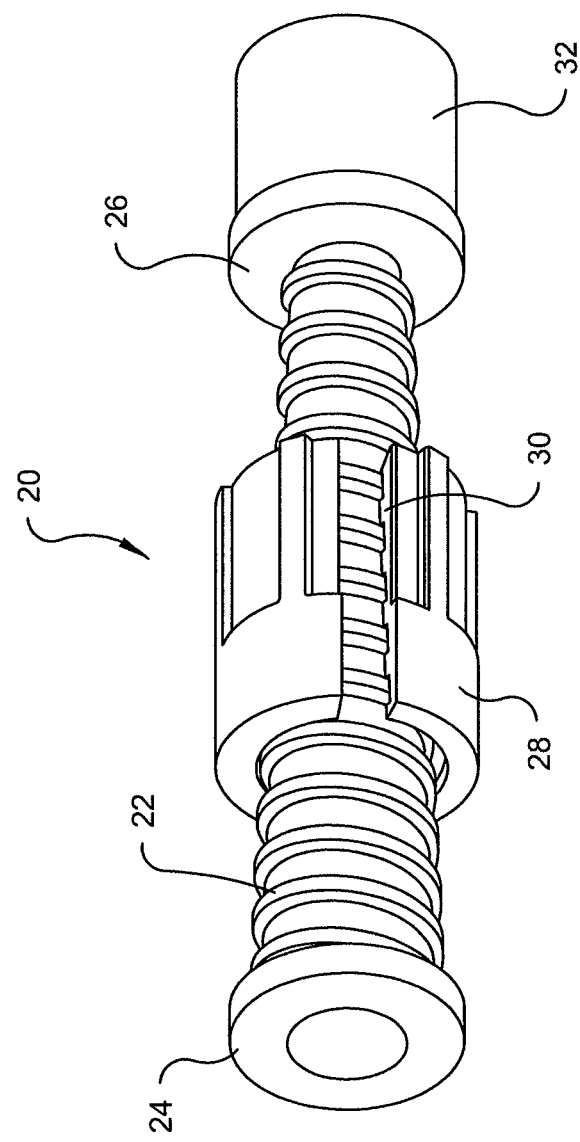
FIG. 3 is an enlarged perspective view of a tension mechanism for use with the tension rod of FIG. 2.

Referring to the drawings in detail, where the same numerals indicate like elements throughout, there is shown in FIGS. 1-3 a first preferred embodiment of a tension rod generally designated 10, and hereinafter referred to as the "tension rod" 10 having a preferred embodiment of a tension rode mechanism generally designated 20 and hereinafter referred to as the "tension mechanism" 20 in accordance with the present invention.

Referring to the drawings in detail, wherein the same reference numerals indicate like elements throughout, there is shown in the drawings a tension rod 10 having a first outer shaft 12 and a second inner shaft 14. The second inner shaft 14 is telescopingly received by the first outer shaft 12 along a longitudinal axis "A" of the tension rod 10, such that the tension rod 10 is adjustable in length. The first and second shafts 12, 14 are preferably made from a metal, such as cold-rolled steel, but may also be constructed using plastic, acrylic, or like material.

Opposing ends of the first and second shafts 12, 14 may terminate in flat end faces 12a, 14a, respectively, to engage a window frame or opposing walls to support the tension rod 10 above a ground surface. Alternatively, the opposing ends of the first and second shafts 12, 14 may be fitted with semi-pliable end caps (not shown), each having a flat end face. Each of the first and second shafts 12, 14 are preferably at least partially hollow along the longitudinal axis A for receiving respective ends of a tension mechanism 20.

Referring to FIGS. 1B and 3, a first end of the tension mechanism 20 includes a first threaded shaft 22 that may be terminate by a first end flange 24 at one end and a center flange 26 at the other end. As can be seen in the cross-sectional view of FIG. 2, a diameter of the first threaded shaft 22 is larger proximate the first end flange 24 than a diameter of the first threaded shaft 22 proximate the center flange 26. That is, the first threaded shaft 22 is tapered having a generally frusto-conically shape.

A collar 28 threadingly engages with the first threaded shaft 22. The collar 28 is configured to be received in the first outer shaft 12 for rotational movement therewith and slidable axial movement relative thereto along the longitudinal axis A and to apply an outwardly-directed radial force to the first outer shaft. In a preferred embodiment, the collar 28 is configured to be initially received in the first outer shaft 12 in a compression fit with the frictional force between the collar 28 and the first outer shaft 12 being sufficient to prevent rotation of the collar 28 relative to the first outer shaft 12 when the first threaded shaft is rotated in the collar 28 while still permitting the collar 28 to slide axially in the first outer shaft 12.

The collar 28 is preferably made from rubber, preferably of low durometer. However, other materials may be used, such as polycarbonate, polystyrene, polypropylene, acrylonitrile butadiene styrene (ABS), styrene acrylonitrile (SAN), polyurethane, polyvinyl chloride (PVC), or the like.

The collar 28 has a longitudinally-extending, circumferentially-expandable slot 30 giving the collar 28 a substantially C-shaped cross-section. The slot 30 allows a diameter of the collar 28 to expand as the collar 28 is rotated along the taper of the first threaded shaft 22 from a contracted state near the center flange 26 in which the collar 28 is slidable along the longitudinal axis A to an expanded state (not shown) near the first end flange 24 in which the first collar 28 is no longer able to move axially in the first outer shaft 12.

Referring to FIGS. 2 and 3, the tension mechanism 20 includes a second attachment shaft 32 extending from the center flange 26 away from the first threaded shaft 22. A diameter of the second attachment shaft 32 is preferably constant along the longitudinal axis A. As seen in FIG. 2, the second attachment shaft 32 is preferably solid, while the first threaded shaft 22 is preferably substantially hollow along the longitudinal axis A. However, both shafts 22, 32 may be hollow, solid, or combinations thereof. The first threaded shaft 22, second attachment shaft 32, and the flanges 24, 26 are preferably integrally formed as a single part molded from a polymeric material. Specifically, materials such as polycarbonate, polystyrene, polypropylene, ABS, SAN, polyurethane, PVC, rubber, or the like may be used. However, the shafts 22, 32 and flanges 24, 26 may also be separate pieces assembled together and made of differing materials.

The second inner shaft 14 fixedly receives the second attachment shaft 32 therein. Preferably, the second attachment shaft 32 is press fit into the second inner shaft 14, and a dimple (not shown) is subsequently formed in the second inner shaft 14 to further lock the second attachment shaft 32 in place. However, the second attachment shaft 32 may also be fixed to the second inner shaft 14 by other methods, such as the use of adhesives, fasteners, welds, or the like.

When the collar 28 is in the first outer shaft 12 and the second attachment shaft 32 is fixedly received in the second inner shaft 14, a first rotation of the first outer shaft 12 relative to the second inner shaft 14 expands the diameter of the collar 28, increasing the outwardly-directed radial force applied by the collar 28 to the first outer shaft 12 as the collar 28 slides axially along the first threaded shaft 22 until the frictional force prevents further axial sliding of the collar 28. If the flat end faces 12a, 14a of the tension rod 10 are in contact with opposed support surfaces (not shown) preventing further extension of the tension rod 10, continued rotation increases the axial loading of the rod and hence the tension in the rod 10.

In use, the tension rod 10 is initially assembled with the tension mechanism 20 in an initial (or starting) configuration in which the collar 28 abuts the center flange 26. The second attachment shaft 32 is fixedly received in the second inner shaft 14 for movement therewith. The second attachment shaft 32 together with the end portion of the second inner shaft 14 to which the second attachment shaft 32 is fixedly attached are inserted in the first outer tube 12.

A user adjusts a length of the tension rod 10 by sliding the first and second shafts 12, 14 with respect to one another along the longitudinal axis A until the tension rod 10 is level between two support surfaces (not shown) and the flat end faces 12a, 14a are in contact with the support surfaces. When the desired length is reached, the first and second shafts 12, 14 are rotated with respect to one another in a first direction, which causes rotation of the first threaded shaft 22 and the second attachment shaft 32 in unison with respect to the collar 28.

The collar 28 then moves along the first threaded shaft 22 away from the center flange 26 and toward the end flange 24. Expansion of the collar 28 as it rotates along the increasing diameter of the first threaded shaft 22 increases the outwardly-directed radial force applied by the collar 28 to the first outer shaft 12, preventing further axial movement of the collar 28 in the first outer shaft 12 and releasably securing with an expansion fit the collar 28 in a fixed position in the first outer shaft 12. In turn, further respective axial sliding movement between the first and second shafts 12, 14 is prevented. The collar 28 also acts as a locking nut and provides increased tension between the support surfaces to support the tension rod 10.

From the foregoing, it can be seen that embodiments of the present invention comprise a tension rod. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A tension rod mechanism for a tension rod having a first outer shaft and a second inner shaft slideably received by the first outer shaft and rotatable about a longitudinal axis of the tension rod, the tension rod mechanism comprising:
    a tapered threaded shaft having first end and an opposing second end, a diameter of the first end of the tapered threaded shaft being larger than a diameter of the second end of the tapered threaded shaft, the tapered threaded shaft being completely threaded and tapered from the first end to the second end;
    an end flange connected to the first end of the tapered threaded shaft and slidably engaging the first outer shaft;
    an expandable collar threadingly engaged with the tapered threaded shaft, the expandable collar configured to be received in the first outer shaft for rotational movement therewith and slidable axial movement relative thereto; and
    an attachment shaft fixedly connected to the second end of the tapered threaded shaft, the attachment shaft configured to be received in the second inner shaft for rotational and slidable axial movement therewith,
    wherein, when the expandable collar is in the first outer shaft and the attachment shaft is fixedly received in the second inner shaft, a first rotation of the first outer shaft relative to the second inner shaft expands a diameter of the collar fixedly attaching the expandable collar to the first outer shaft for axial movement therewith.

2. The tension rod mechanism according to claim 1, wherein the expandable collar is configured to be initially received in the first outer shaft in a compression fit creating a frictional force between the collar and the first outer shaft sufficient to prevent rotation of the expandable collar relative to the first outer shaft when the tapered threaded shaft is rotated in the expandable collar while still permitting the expandable collar to slide axially in the first outer shaft.

3. The tension rod mechanism according to claim 1, wherein the expandable collar has a longitudinally-extending, circumferentially-expandable slot allowing a diameter of the expandable collar to expand as the expandable collar is rotated along the tapered threaded shaft.

4. The tension rod mechanism according to claim 1, wherein the attachment shaft has a constant diameter along the longitudinal axis.

5. The tension rod mechanism according to claim 1, wherein a center flange fixedly connects the tapered threaded shaft to the attachment shaft.

6. The tension rod mechanism according to claim 5, wherein the tapered threaded shaft, the center flange and the attachment shaft are integrally formed as a single part.

7. A tension rod comprising: a first outer shaft; and a second inner shaft slideably received by the first outer shaft, wherein the first outer shaft and the second inner shaft are operatively coupled by the tension rod mechanism of claim 1.

8. The tension rod of claim 7, wherein the tension rod is in contact with opposed support surfaces preventing further extension of the tension rod and continued rotation of the first outer shaft relative to the second inner shaft increases a tension in the rod.

9. The tension rod mechanism according to claim 3, wherein the expandable collar has a substantially C-shaped cross-section.

10. The tension rod mechanism according to claim 1, wherein the expandable collar has a single longitudinally-extending, circumferentially-expandable slot.

* * * * *